Figure 1:
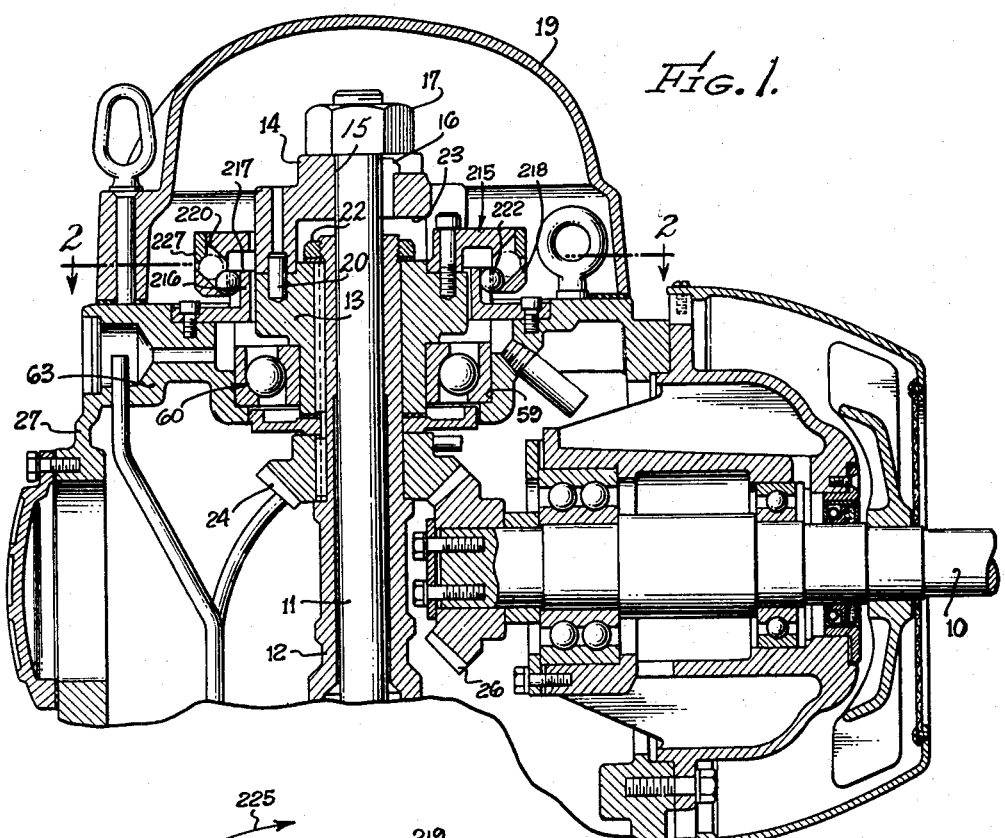

Nov. 29, 1960  F. O. LUENBERGER  2,962,127
ENCLOSED TRANSMISSION MECHANISM
Original Filed Sept. 28, 1953

FREDERICK O. LUENBERGER
INVENTOR.

BY Flam and Flam

ATTORNEYS.

United States Patent Office 2,962,127
Patented Nov. 29, 1960

2,962,127
ENCLOSED TRANSMISSION MECHANISM

Frederick O. Luenberger, Los Angeles, Calif., assignor to U.S. Electrical Motors, Inc., Los Angeles, Calif., a corporation of California Original application Sept. 28, 1953, Ser. No. 382,732, now Patent No. 2,793,714, dated May 28, 1957. Divided and this application Dec. 31, 1956, Ser. No. 637,345

2 Claims. (Cl. 188—82.84)

This invention relates to a power transmission mechanism, and particularly to a power transmission mechanism for a pump turbine shaft.

Desirably the pump turbine shaft is held against reverse movement when a driving torque is no longer applied. Accordingly, the primary object of this invention is to provide a novel ratchet-type construction for preventing shaft reversal and which utilizes restraining balls that are readily and freely released upon the application of a driving torque.

Another object of this invention is to provide a ratchet-type device of this character that achieves a smooth, gradual stopping of rotation and substantially without impact.

Thus, it is a corresponding object of this invention to provide an improved and simple ratchet construction of this character that precludes the pump turbine shaft from gaining momentum or speed before the mechanical restraint is applied.

This application is a division of my application Serial No. 382,732, filed September 28, 1953, and entitled "Lubrication System for Enclosed Transmission Mechanism," now Patent No. 2,793,714, issued May 28, 1957.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Figure 2:
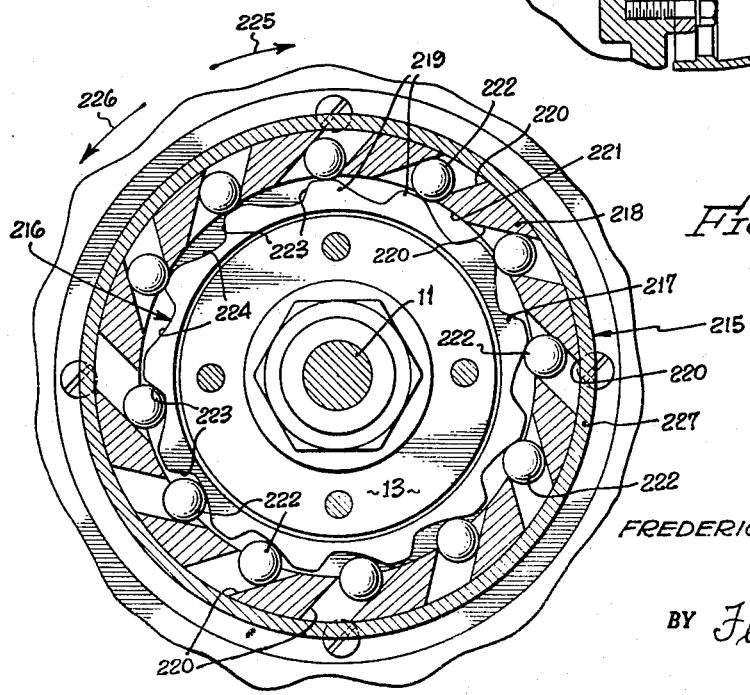

Referring to the drawings:

Figure 1 is a fragmentary sectional view of a transmission mechanism incorporating the present invention; and Fig. 2 is an enlarged sectional view, taken long a plane indicated by line 2—2 of Fig. 1.

A horizontal shaft 10 is adapted to be suitably connected to a source of rotary motion. The horizontal orientation of the shaft 10 is intended to facilitate operation of the device from an internal combustion engine or equivalent source of power. Optionally, an electric motor could be provided for this purpose.

The shaft 10, through mechanisms to be hereinafter more fully described, imparts rotary motion to a vertical shaft 11. This shaft 11 may be connected, for instance, to a pump, or the like, operating in a well. The shafts 11 and 10 are rotatably coupled by the aid of a hollow shaft 12 that is in telescoping relationship with the driven shaft 11.

A coupling connection between the hollow shaft 12 and the driven shaft 11 is effected by the aid of through apertured coupling members 13 and 14. The lower coupling member 13 is connected as by a spline to the hollow shaft 12. The inner driven shaft 11 extends beyond the upper end of the hollow shaft and passes through a central aperture 15 of the upper coupling member 14. A spline 16 rotatably couples the driven shaft 11 to the upper coupling member 14.

A lock nut 17, engaging appropriate threads on the end of the driven shaft 11, adjustably determines the longitudinal position of the driven shaft 11. To render the nut 17 accessible, an upper bell cover 19 is removably mounted on the main casing structure 27, and may be made of cast aluminum for facilitating handling.

The coupling members 13 and 14 are rotatably connected by the aid of a series of pins 20 extending between opposed engaging surfaces of the members.

The hollow shaft 12 extends just above the lower coupling member 13. A lock nut 22, extending in a lower recess 23 of the upper coupling member 14, and carried at the upper end of the hollow shaft 12, engages the upper surface of the coupling member 13 to limit downward movement of the hollow shaft 12.

The hollow shaft 12 carries a bevel gear 24. A corresponding bevel gear 26, in engagement with bevel gear 24, is carried at the innermost end of the driving shaft 10. A driving connection is thus effected through the bevel gears 26, 24, the hollow shaft 12, coupling members 13 and 14, and the spline 16 to the inner driven shaft 11.

A bearing structure 60, which supports the lower coupling member 13, rests in an enlarged upper portion of a recess 59 in the top casing wall 63.

A rotary and a non-rotary ratchet member 215 and 216 are provided for preventing undesirable reverse movement of the driven shaft 11. The rotary member 215 is carried for rotation by the coupling member 13 secured to the hollow shaft 12. The non-rotary ratchet member 216 is carried on the top wall 63 of the casing 27.

The non-rotary member 216 has an upwardly extending flange 217 extending within and spaced from a depending peripheral flange 218 of the rotary member 215. As shown most clearly in Fig. 2, the upwardly extending flange 217 is provided with a series of ratchet teeth 219 extending on the peripheral surface of the flange 217 opposed to the inner surface of the depending flange 218 of the rotary member 215. The depending flange 218 has a series of recesses 220 opening into the surface 221 thereof that is exposed to the ratchet teeth 219. Ball detents 222 cooperable with the teeth 219 are accommodated in each of the recesses 220. The flange 217 of the non-rotary member thus has an interrupted external cylindrical surface opposed to the internal cylindrical surface of the rotary member 215. Both these cylindrical surfaces are on a common axis and are quite closely spaced.

As shown most clearly in Fig. 6, the recesses 220 are sufficiently inclined to the horizontal so that the weight of the ball detents 222 urges them inwardly toward the ratchet teeth 219.

As shown most clearly in Fig. 2, the recesses or apertures 220 are also each askew to the axis of the device by being inclined to a radial line extending therefrom toward the common axis of rotation of the structure. The counterclockwisemost surfaces of the recesses 220 are opposed to correspondingly inclined shoulders 223 of the ratchet teeth. The axis of the detent recesses 220 is substantially normal to the slightly sloping surfaces 224 of the ratchet teeth 219. The detents 222 may become wedged between the counterclockwisemost surface of their recesses 220 and a shoulder 223 without moving entirely beyond their recesses. To produce such wedging, the balls, when received in the deep end of the corresponding recesses, extend outwardly of the recesses.

Such wedging takes place, for instance, upon relative movement between a shoulder 223 and its then opposed counterclockwisemost portion of a recess surface. Such movement takes place upon angular movement of the shaft 11 and rotary member 215 in the direction of the arrow 225. The reverse rotation is thus stopped before any substantial angular velocity is attained.

Correspondingly, when the shoulders 223 move away from the then opposed counterclockwisemost portion of a recess surface, the detents 222 may not become wedged but, on the contrary, are urged into their recesses 220 by the sloping surfaces of the ratchet teeth 219. The axes of the apertures 220 are non-radial to the members 215 and 216 and slope inwardly toward the free direction of rotation of member 215. Thus, rotation between the members is permitted in one relative direction, such as by rotation of the rotary member in the direction of the arrow 226. As soon as sufficient angular speed is attained, the balls 222 are urged by centrifugal force upwardly of the recesses 220 and out of contact with teeth 219.

The number of detents is prime with respect to the number of ratchet teeth. In the present instance, twelve ball detents 222 are provided, and thirteen ratchet teeth 219 are provided. Thus, for any position of the ratchet members, there are twelve relative positions of ball detents with respect to ratchet teeth. Thus, only one ball detent 222 may be in wedging relationship at a time.

For one-thirteenth of a revolution between the members, twelve detents pass in sequence through positions in which they might be wedged. Thus, for each revolution, there are one hundred and fifty-six sequential wedging possibilities. The maximum movement of the rotary ratchet member in the reverse direction is thus approximately two degrees of arc. On the average, the reverse movement of the rotary ratchet member permitted will be about one degree of arc.

The recesses 220 for the ball detents 222 are formed by providing through apertures in the flange 218 of the rotary ratchet member 215. A press-fitted ring 227 is accommodated on the flange 218 to prevent movement of the detents 222 beyond the outer ends of these recesses 220, under the influence of centrifugal force.

The recesses 224 are so closely spaced as to leave only a small angular extent between the ends of adjacent recesses. Due to the numerous recesses and balls and to the length of the apertures 220 and of the recesses along the circumference of member 215, a smooth, gradual engagement of the ball detents 222 is effected.

Conveniently, the non-rotary ratchet member 216 provides the function of the annular bracket 72 described in connection with the previous forms. Thus, the lower surface of the non-rotary ratchet member 216 defines the space above the bearing structure 60 through which lubricant passes therefor.

I claim:

1. In a one-way drive structure having a vertical axis: a non-rotary member having an interrupted external cylindrical surface, the surface being coaxial with the said axis; the interruptions being formed by a plurality of equiangularly spaced recesses opening into said cylindrical surface; the recesses having a sloping bottom surface forming a deep end and a shallow end, the recesses being spaced along the circumference so that the deep end of any recess is adjacent the shallow end of an adjacent recess; the recesses being all alike; a rotary member above the non-rotary member and having a flange with an internal cylindrical surface coaxial with the said axis and closely spaced from the external interrupted cylindrical surface; cylindrical guiding apertures opening in said internal cylindrical surface, and equiangularly spaced around the internal surface; the axis of each of the apertures extending upwardly and outwardly with respect to said internal surface, the axes of all of the apertures being non-radial to said cylindrical surfaces, the aperture axes also being such that they incline inwardly toward the external cylindrical surface, in the direction corresponding to the desired rotation of the rotary member; and a ball guided in each aperture and urged by gravity toward the recesses, the depth of the deep portion of each recess being such that when any ball is received in said deep end, it extends beyond the external cylindrical surface.

2. In a one-way drive structure having a vertical axis: a non-rotary member having an interrupted external cylindrical surface, the surface being coaxial with the said axis; the interruptions being formed by a plurality of equiangularly spaced recesses opening into said cylindrical surface; the recesses having a sloping bottom surface forming a deep end and a shallow end, the recesses being spaced along the circumference so that the deep end of any recess is adjacent the shallow end of an adjacent recess; the recesses being all alike; a rotary member above the non-rotary member having a flange with an internal cylindrical surface coaxial with the said axis and closely spaced from the external interrupted cylindrical surface; cylindrical guiding apertures opening in said internal cylindrical surface, and equiangularly spaced around the internal surface; the axis of each of the apertures extending upwardly and outwardly with respect to said internal surface, the axes of all of the apertures being non-radial to said cylindrical surfaces, the aperture axes also being such that they incline inwardly toward the external cylindrical surface, in the direction corresponding to the desired rotation of the rotary member; the number of apertures being substantially the same as the number of recesses; and a ball guided in each aperture and urged by gravity toward the recesses, the depth of the deep portion of each recess being such that when any ball is received in said deep end, it extends beyond the external cylindrical surface; the external cylindrical surface between the ends of the recesses having substantially less angular extent than the recesses.

References Cited in the file of this patent

UNITED STATES PATENTS

| | | |
|---|---|---|
| 697,206 | Henderson | Apr. 8, 1902 |
| 792,567 | Wright | June 13, 1905 |
| 1,270,570 | Van Ness | June 25, 1918 |
| 1,337,634 | Benson | Apr. 20, 1920 |
| 1,499,923 | Hall | July 1, 1924 |
| 2,239,986 | Blood | Apr. 29, 1941 |
| 2,364,599 | Burrus | Dec. 12, 1944 |
| 2,372,026 | Smith | Mar. 20, 1945 |
| 2,481,914 | Eastman et al. | Sept. 13, 1949 |
| 2,540,997 | Schmitter | Feb. 6, 1951 |
| 2,548,805 | Moir et al. | Apr. 10, 1951 |
| 2,602,711 | Imshaug | July 8, 1952 |
| 2,824,625 | Rice | Feb. 25, 1958 |